US012686795B2

(12) United States Patent
Shin et al.

(10) Patent No.: US 12,686,795 B2
(45) Date of Patent: Jul. 21, 2026

(54) MULTILAYER ADHESIVE SHEET, OPTICAL MEMBER COMPRISING THE SAME AND DISPLAY APPARATUS COMPRISING THE SAME

(71) Applicant: SAMSUNG SDI CO., LTD., Yongin-si (KR)

(72) Inventors: Dong Myeong Shin, Suwon-si (KR); Gwang Hwan Lee, Suwon-si (KR); Sung Hyun Mun, Suwon-si (KR); Il Jin Kim, Suwon-si (KR); Do Young Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 78 days.

(21) Appl. No.: 17/860,696

(22) Filed: Jul. 8, 2022

(65) Prior Publication Data

US 2023/0029017 A1      Jan. 26, 2023

(30) Foreign Application Priority Data

Jul. 9, 2021      (KR) ......................... 10-2021-0090149

(51) Int. Cl.
    *C09J 7/25*        (2018.01)
    *B32B 7/12*        (2006.01)
            (Continued)

(52) U.S. Cl.
    CPC   *C09J 7/25* (2018.01); *B32B 7/12* (2013.01); *B32B 17/10* (2013.01); *B32B 27/08* (2013.01);
        (Continued)

(58) Field of Classification Search
    CPC ......................... C08F 220/1808; C08F 220/20
    See application file for complete search history.

(56) References Cited

U.S. PATENT DOCUMENTS

| | | | |
|---|---|---|---|
| 2015/0232707 A1* | 8/2015 | Yoon | C09J 175/04 |
| | | | 522/42 |
| 2016/0122600 A1* | 5/2016 | Moon | C09J 7/22 |
| | | | 428/354 |
| 2019/0225845 A1* | 7/2019 | Lee | C09J 133/10 |

FOREIGN PATENT DOCUMENTS

| | | |
|---|---|---|
| CN | 104540916 A | 4/2015 |
| JP | 2016-060117 A | 4/2016 |

(Continued)

OTHER PUBLICATIONS

Korean Office Action dated Sep. 18, 2023, issued in corresponding Korean Patent Application No. 10-2021-0090149 (5 pages).

(Continued)

*Primary Examiner* — Eli D. Strah
(74) *Attorney, Agent, or Firm* — Womble Bond Dickinson (US) LLP

(57)        ABSTRACT

A multilayer adhesive sheet, an optical member including the same, and a display apparatus including the same are provided. A multilayer adhesive sheet includes: a base layer; a first adhesive layer stacked on a surface of the base layer; and a second adhesive layer stacked on another surface of the base layer, and the base layer includes a polyurethane-based film manufactured by solution casting and has a storage modulus of 700 MPa to 1,500 MPa at −20° C. and a storage modulus of 10 MPa to 100 MPa at 85° C.

11 Claims, 2 Drawing Sheets

(51) Int. Cl.

| | |
|---|---|
| *B32B 17/10* | (2006.01) |
| *B32B 27/08* | (2006.01) |
| *B32B 27/40* | (2006.01) |
| *C08F 220/18* | (2006.01) |
| *C09J 4/00* | (2006.01) |
| *C09J 7/38* | (2018.01) |
| *C09J 11/04* | (2006.01) |
| *C09J 11/06* | (2006.01) |
| *C09J 133/04* | (2006.01) |
| *C09J 151/00* | (2006.01) |
| *G09F 9/30* | (2006.01) |
| *C09J 7/30* | (2018.01) |
| *C09J 133/08* | (2006.01) |
| *C09J 133/10* | (2006.01) |

(52) U.S. Cl.
CPC ........ *B32B 27/40* (2013.01); *C08F 220/1808* (2020.02); *C09J 4/00* (2013.01); *C09J 7/385* (2018.01); *C09J 11/04* (2013.01); *C09J 11/06* (2013.01); *C09J 133/04* (2013.01); *C09J 151/00* (2013.01); *C09J 151/003* (2013.01); *G09F 9/30* (2013.01); *G09F 9/301* (2013.01); *B32B 2255/10* (2013.01); *B32B 2255/26* (2013.01); *B32B 2255/28* (2013.01); *B32B 2307/54* (2013.01); *B32B 2307/558* (2013.01); *B32B 2307/732* (2013.01); *B32B 2405/00* (2013.01); *B32B 2457/20* (2013.01); *B32B 2457/202* (2013.01); *B32B 2457/206* (2013.01); *B32B 2457/208* (2013.01); *B32B 2551/00* (2013.01); *C09J 7/30* (2018.01); *C09J 133/08* (2013.01); *C09J 133/10* (2013.01); *C09J 2203/318* (2013.01); *C09J 2203/326* (2013.01); *C09J 2301/124* (2020.08); *C09J 2301/16* (2020.08); *C09J 2301/312* (2020.08); *C09J 2301/408* (2020.08); *C09J 2433/00* (2013.01); *C09J 2475/006* (2013.01); *C09K 2323/05* (2020.08); *C09K 2323/057* (2020.08); *C09K 2323/06* (2020.08)

(56) References Cited

FOREIGN PATENT DOCUMENTS

| | | | |
|---|---|---|---|
| KR | 10-2016-0053779 A | 5/2016 | |
| KR | 10-2017-0078510 A | 7/2017 | |
| KR | 10-2017-0114642 A | 10/2017 | |
| KR | 10-2020-0006442 A | 1/2020 | |
| KR | 20200006442 A * | 1/2020 | .............. G02B 1/10 |

OTHER PUBLICATIONS

Ding Yanwei, USTC Press, "Fundamentals of Thermal Analysis", 1st Edition, p. 244, Feb. 29, 2020 (7 pages including English translation).

Zhao Shilu, Metallurgical Industry Press, "Cutting Performance of Materials Used for High- Performance and Coated Tools", 1st Edition, p. 61, May 31, 2015 (6 pages, including English translation).

Chinese Office Action dated Jul. 22, 2023, issued in corresponding Chinese Patent Application No. 202210799778.8 (8 pages).

Korean Notice of Allowance dated Sep. 26, 2024, issued in corresponding Korean Patent Application No. 10-2021-0090149 (7 pages).

* cited by examiner

110

100

120

MULTILAYER ADHESIVE SHEET, OPTICAL MEMBER COMPRISING THE SAME AND DISPLAY APPARATUS COMPRISING THE SAME

CROSS-REFERENCE TO RELATED APPLICATION

This application claims priority to and the benefit of Korean Patent Application No. 10-2021-0090149, filed on Jul. 9, 2021 in the Korean Intellectual Property Office, the entire disclosure of which is incorporated herein by reference.

BACKGROUND

1. Field

Aspects of embodiments of the present invention relate to a multilayer adhesive sheet, an optical member including the same, and a display apparatus including the same.

2. Description of the Related Art

In recent years, interest in a foldable display apparatus including a foldable phone and the like has rapidly increased. In the foldable display apparatus, various elements are stacked via adhesive films. Accordingly, an adhesive film having flexural reliability is being developed in the art. However, since the adhesive film is required to have both adhesion and flexural reliability, the adhesive film is vulnerable to external impact. Thus, there is a need for an adhesive film capable of securing absorption and distribution of external impact while providing typical functions thereof.

On the other hand, since the adhesive film is manufactured to have a larger area than a foldable phone, the adhesive film is finally subjected to a punching process. In the punching process, a blade is applied from one side of the adhesive film to the other side thereof. In this process, the adhesive film suffers generation of dents and/or scratches. In particular, when a layer exhibiting completely different characteristics than the adhesive film is interposed between the adhesive films, punchability of the adhesive film is likely to worsen.

The background technique of the present invention is disclosed in Japanese Unexamined Patent Publication No. 2016-060117 and the like.

SUMMARY

According to an aspect of the present invention, a multilayer adhesive sheet that has good flexural reliability at both low temperature and high temperature is provided.

According to another aspect of the present invention, a multilayer adhesive sheet that secures good effects in absorption and distribution of external impact while exhibiting good impact resistance is provided.

According to another aspect of the present invention, a multilayer adhesive sheet that has good punchability or cuttability is provided.

According to another aspect of the present invention, a multilayer adhesive sheet that has low haze to secure good optical characteristics is provided.

According to another aspect of the present invention, a multilayer adhesive sheet that has good appearance is provided.

According to an aspect of one or more embodiments of the present invention, a multilayer adhesive sheet is provided.

According to one or more embodiments of the present invention, a multilayer adhesive sheet includes: a base layer; a first adhesive layer stacked on a surface of the base layer; and a second adhesive layer stacked on another surface of the base layer, wherein the base layer includes a polyurethane-based film manufactured by solution casting and has a storage modulus of 700 MPa to 1,500 MPa at −20° C. and a storage modulus of 10 MPa to 100 MPa at 85° C.

In one or more embodiments, the base layer may have a thickness of greater than 0 μm to 100 μm.

In one or more embodiments, the base layer may have a Young's modulus of 50 MPa to 500 MPa at 25° C.

In one or more embodiments, the first adhesive layer may have a storage modulus of 10 kPa to 500 kPa at −20° C. and a storage modulus of 10 kPa to 100 kPa at 60° C., and the second adhesive layer may have a storage modulus of 10 kPa to 500 kPa at −20° C. and a storage modulus of 10 kPa to 100 kPa at 60° C.

In one or more embodiments, each of the first adhesive layer and the second adhesive layer may have a thickness of 10 μm to 50 μm.

In one or more embodiments, a laminate of the first adhesive layer, the base layer, and the second adhesive layer may have a tensile modulus of 0.05 GPa to 2 GPa at 25° C.

In one or more embodiments, a tensile modulus of the base layer at 25° C. may be 75% to 200% of the tensile modulus of the laminate of the first adhesive layer, the base layer, and the second adhesive layer at 25° C.

In one or more embodiments, the first adhesive layer may be formed of an adhesive composition including a monomer mixture for a hydroxyl group-containing (meth)acrylic copolymer; particles or a particle mixture including at least one selected from among organic particles and inorganic particles; and an initiator, and the second adhesive layer may be formed of an adhesive composition including a monomer mixture for a hydroxyl group-containing (meth)acrylic copolymer; particles or a particle mixture including at least one selected from among organic particles and inorganic particles; and an initiator.

In one or more embodiments, the multilayer adhesive sheet may have a pen-drop impact resistance of 5.5 cm or more.

According to an aspect of one or more embodiments of the present invention, an optical member is provided.

According to one or more embodiments of the present invention, an optical member includes a multilayer adhesive sheet according to an embodiment of the present invention, and a member (e.g., an optical element) stacked on a surface (e.g., an upper surface) of the multilayer adhesive sheet.

A display apparatus according to one or more embodiments of the present invention includes a multilayer adhesive sheet or an optical member according to an embodiment of the present invention.

DETAILED DESCRIPTION

Figure 1:
FIG. 1 is a cross-sectional view of a multilayer adhesive sheet according to an embodiment of the present invention.

Herein, some embodiments of the present invention will be described in further detail with reference to the accompanying drawings to provide a thorough understanding of the invention to those skilled in the art. It is to be understood that the present invention is not limited to the following embodiments and may be embodied in different ways. In the drawings, components unrelated to the description may be omitted for clear description of the invention, and like components may be denoted by like reference numerals throughout the specification. Although lengths, thicknesses, and/or widths of various components may be exaggerated for understanding in the drawings, the present invention is not limited thereto.

Herein, spatially relative terms, such as "upper" and "lower," are defined with reference to the accompanying drawings. Thus, it is to be understood that the term "upper surface" can be used interchangeably with the term "lower surface," for example. In addition, when an element, such as a layer, film, region, or substrate is referred to as being "on" another element, it may be directly on the other element or one or more intervening elements may also be present. In contrast, when an element is referred to as being "directly on" another element, there are no intervening elements present.

Herein, the term "(meth)acryl" refers to acryl and/or methacryl.

Herein, "storage modulus" of each of a first adhesive layer and a second adhesive layer was measured using a dynamic mechanical analyzer ARES G2 (TA) rheometer in an auto-strain condition of 1% strain while raising the shear rate from 0.1 rad/sec to 100 rad/sec. Storage modulus was measured while raising the temperature from −20° C. to 90° C. at a heating rate of 5° C./min. In measurement of storage modulus, a specimen was prepared by stacking adhesive layers each having a thickness of 50 μm to 100 μm to form a laminate having a thickness of 500 μm, followed by punching the laminate using a ϕ8 mm punching machine.

Herein, "fracture elongation" of a base layer may be measured in accordance with ASTM D638. For example, fracture elongation of the base layer may be measured on a Type V specimen of the base layer using a UTM (Instron) at a tensile rate of 100 mm/min.

Herein, an average particle diameter of organic particles refers to a particle diameter measured in a water-based or organic solvent using a Zetasizer nano-ZS (Malvern Inc.) and represented by a Z-average value, and observed by SEM/TEM.

Herein, an average particle diameter of inorganic particles refers to D50, which is measured using a particle analyzer. Here, D50 may be measured using the particle analyzer after the inorganic particles are dispersed in a solvent at 25° C. for 3 minutes or may be obtained with reference to commercially available catalogues.

Herein, "pen-drop impact resistance" was measured on a specimen prepared by sequentially stacking a polyethylene terephthalate (PET) film (thickness: 38 μm), an adhesive film (thickness: 25 μm, storage modulus at 25° C.: 0.03 MPa) and a PET film (thickness: 125 μm) on a lower surface of a second adhesive layer in a multilayer adhesive sheet, and refers to an initial height at which dents are initially formed on the lowermost PET film of the specimen upon dropping a ball-point pen (BIC Co., Ltd., crystal material, ϕ0.7 mm pen) from a predetermined height above the first adhesive layer of the specimen.

As used herein to represent a specific numerical range, the expression "X to Y" means a value that is "greater than or equal to X and less than or equal to Y" (X≤ and ≤Y).

According to an aspect, a multilayer adhesive sheet according to the present invention has good flexural reliability at low temperature and high temperature. Thus, the multilayer adhesive sheet allows adhesion between different optical elements in a foldable display apparatus while securing good flexural reliability in a broad temperature range including not only low temperature and high temperature but also room temperature.

According to another aspect, the multilayer adhesive sheet according to the present invention has good effects in absorption and distribution of external impact while exhibiting good impact resistance. The multilayer adhesive sheet may be applied to a foldable phone and the like and may be subjected to repeated daily impact in use of the foldable phone by a user. The foldable phone may employ ultrathin glass (UTG) or a plastic film including a polyimide film as a window film. Daily impact may include writing or drawing on the surface of the foldable phone by a user. The multilayer adhesive sheet according to the present invention can prevent or substantially prevent damage, such as cracks, bright spots (that is, damage to an optical element), and the like, to the foldable phone due to external impact even upon repetition of daily impact.

According to another aspect, the multilayer adhesive sheet according to the present invention has good impact resistance to prevent or substantially prevent damage to various optical elements adhered to the multilayer adhesive sheet even under relatively significant impact. With regard to this, the multilayer adhesive sheet according to the present invention may have a pen-drop impact resistance of 5.5 cm or more, for example, 6 cm to 10 cm.

According to another aspect, the multilayer adhesive sheet according to the present invention has good punchability or cuttability. A base layer is interposed between the first adhesive layer and the second adhesive layer. Although each of the first adhesive layer and the second adhesive layer has a different modulus than the base layer, the base layer has a lower modulus than a typical film, such as a polyethylene terephthalate (PET) film, a polyimide (PI) film, and the like, to allow less generation of dents on an adhesive layer or less damage to a punched surface even upon punching the multilayer adhesive sheet at a side of the first adhesive layer or the second adhesive layer, thereby securing good punchability of the multilayer adhesive sheet.

According to another aspect, the multilayer adhesive sheet according to the present invention exhibits low haze to secure good optical characteristics and has good appearance. Here, "good appearance" means that the entirety of the multilayer adhesive sheet does not suffer from generation of stripe patterns, gel, and/or opaqueness upon illumination of the multilayer adhesive sheet at the side of the first adhesive layer or the second adhesive layer with light (for example, natural light or visible light). In an embodiment, the multilayer adhesive sheet may be disposed on a lower surface of a window film in a display apparatus to provide good screen visibility of the display apparatus.

A multilayer adhesive sheet according to an embodiment of the invention includes: a base layer; a first adhesive layer stacked on a surface of the base layer; and a second adhesive layer stacked on another surface of the base layer, wherein the base layer includes a polyurethane-based film manufactured by a solution casting method and has a storage modulus of 700 MPa to 1,500 MPa at −20° C. and a storage modulus of 10 MPa to 100 MPa at 85° C.

In an embodiment, the multilayer adhesive sheet may have a thickness of 150 μm or less, for example, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 105 μm, 110 μm, 115 μm, 120 μm, 125

µm, 130 µm, 135 µm, 140 µm, 145 µm, or 150 µm, and, in an embodiment, 10 µm to 150 µm. Within this range, the multilayer adhesive sheet can be used in a display apparatus.

In an embodiment, the multilayer adhesive sheet may have a trilayer structure in which the first adhesive layer is directly formed on the base layer and the second adhesive layer is directly formed on the base layer. Here, "directly formed on" means that another adhesive layer, bonding layer, or adhesive bonding layer is not stacked between the first adhesive layer and the base layer and between the base layer and the second adhesive layer.

FIG. 1 is a cross-sectional view of a multilayer adhesive sheet according to an embodiment of the invention. Referring to FIG. 1, in an embodiment, a multilayer adhesive sheet may have a structure in which a second adhesive layer 120, a base layer 100, and a first adhesive layer 110 are sequentially stacked in the stated order.

Base Layer

The base layer 100 is formed between the first adhesive layer 110 and the second adhesive layer 120 to support the first adhesive layer and the second adhesive layer.

In an embodiment, the base layer 100 includes a polyurethane-based film manufactured by a solution casting method and provides good appearance to the multilayer adhesive sheet. In an embodiment, the polyurethane-based film manufactured by a solution casting method provides good appearance even when stacked between adhesive layers containing particles. The multilayer adhesive sheet having good appearance may provide good appearance to the entirety of a display apparatus while securing good screen visibility when stacked on a lower surface of a window film in a foldable display apparatus.

In an embodiment, the base layer 100 includes the polyurethane-based film manufactured by a solution casting method and has a storage modulus of 700 MPa to 1,500 MPa at −20° C. and a storage modulus of 10 MPa to 100 MPa at 85° C. With the base layer, the multilayer adhesive sheet has good flexural reliability at both low temperature and high temperature, thereby providing good flexural reliability in a broad temperature range including not only low temperature and high temperature but also room temperature. In addition, the multilayer adhesive sheet including the base layer can improve effects in absorption and distribution of external impact while securing improvement in good impact resistance.

Even with a storage modulus of 700 MPa to 1,500 MPa at −20° C. and a storage modulus of 10 MPa to 100 MPa at 85° C., a polyurethane-based film manufactured by a method, such as melt extrusion and the like, instead of a solution casting method can provide poor appearance to the multilayer adhesive sheet due to generation of gel or foreign matter upon polymer melting in manufacture of the base layer, as compared to the multilayer adhesive sheet according to embodiments of the present invention. Even when the polyurethane-based film manufactured by a solution casting method is used as the base layer, the multilayer adhesive sheet can suffer from problems such as interface delamination in evaluation of folding reliability at low temperature or high temperature, buckling (formation of wrinkles on a surface of the adhesive layer at low temperature), cracking, and the like, when the polyurethane-based film fails to satisfy the ranges according to an embodiment of the present invention in terms of storage modulus at −20° C. and storage modulus at 85° C.

In an embodiment, the base layer has a storage modulus at −20° C. of, for example, 700 MPa, 750 MPa, 800 MPa, 850 MPa, 900 MPa, 950 MPa, 1,000 MPa, 1,050 MPa, 1,100 MPa, 1,150 MPa, 1,200 MPa, 1,250 MPa, 1,300 MPa, 1,350 MPa, 1,400 MPa, 1,450 MPa, or 1,500 MPa, and, in an embodiment, 900 MPa to 1,300 MPa, and a storage modulus at 85° C. of, for example, 10 MPa, 20 MPa, 30 MPa, 40 MPa, 50 MPa, 60 MPa, 70 MPa, 80 MPa, 90 MPa, or 100 MPa, and, in an embodiment, 20 MPa to 80 MPa, and, in an embodiment, 35 MPa to 80 MPa. Within this range, the base layer can provide the aforementioned effects of the present invention and can be easily manufactured.

In an embodiment, tensile modulus (unit: MPa) of the base layer at 25° C. may be in a range of 75% to 200%, for example, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, or 200%, and, in an embodiment, 75% to 100%, and, in an embodiment, 75% to 95%, of tensile modulus of a laminate of the first adhesive layer, the base layer, and the second adhesive layer at 25° C., that is, tensile modulus of the multilayer adhesive sheet at 25° C. Within this range, the base layer can provide the aforementioned effects of the present invention. Tensile modulus of the base layer at 25° C. may be measured substantially by the same method as in measurement of tensile strength of the laminate, that is, the multilayer adhesive sheet.

The solution casting method is a process of manufacturing a polyurethane-based film by depositing a solution containing a polyurethane-based resin (a polyol, an isocyanate curing agent, an additive, and the like) and a solvent onto a non-adhesive surface, followed by evaporation of the solvent at high temperature and heat curing. The inventors of the present invention confirmed that a polyurethane-based film manufactured by solution casting has high modulus under conditions of the same composition and the same thickness, thereby assisting in improvement in absorption and distribution of external impact while easily securing good external appearance, as compared to a thermoplastic polyurethane (TPU) film manufactured by typical melt extrusion. A cast polyurethane (PU) film manufactured by solution casting does not allow generation of stripe patterns, gel, and/or opaqueness upon irradiation with light, for example, natural light, visible light, or UV light, thereby assisting in improvement in external appearance of the multilayer adhesive sheet, as compared to the thermoplastic polyurethane film manufactured by melt extrusion.

In an embodiment, the polyurethane-based resin may be prepared from a bi- or higher polyfunctional polyol and a bi- or higher polyfunctional isocyanate. In an embodiment, the polyol may include at least one selected from among an aromatic polyol, an aliphatic polyol, and an alicyclic polyol. In an embodiment, the polyurethane resin is prepared from an aliphatic polyol and/or an alicyclic polyol. The polyol may include at least one selected from among polyester diol, polycarbonate diol, polyolefin diol, polyether diol, polythioether diol, polysiloxane diol, polyacetal diol, and polyester amide diol, without being limited thereto. The polyfunctional isocyanate may include any aliphatic, cycloaliphatic, or aromatic isocyanate. Chain extenders may include diols, such as aliphatic diols, amino alcohols, diamines, hydrazines, hydrazides, or mixtures thereof. In preparation of thermoplastic polyurethane, a tin compound, for example, a tin salt of carboxylic acid, an amine, for example, dimethyl cyclohexyl amine or triethylene diamine, may be further included as catalysts for accelerating formation of urethane bonds. In preparation of the thermoplastic polyurethane, other typical components, for example, a surfactant, a flame retardant, fillers, pigments, and the like, may be further included.

In an embodiment, for the base layer, storage modulus at −20° C. and storage modulus at 85° C. can be achieved by adjusting the molecular weight, for example, the weight average molecular weight, of the polyol used in preparation of the polyurethane-based film by the solution casting method. The molecular weight of the polyol can be easily adjusted by a method known to those skilled in the art.

In an embodiment, the base layer 100 may have a Young's modulus at 25° C. of 50 MPa to 500 MPa. Within this range, the base layer 100 can improve impact resistance of the multilayer adhesive sheet. In an embodiment, the base layer 100 has a Young's modulus at 25° C. of, for example, 50 MPa, 60 MPa, 70 MPa, 80 MPa, 90 MPa, 100 MPa, 110 MPa, 120 MPa, 130 MPa, 140 MPa, 150 MPa, 160 MPa, 170 MPa, 180 MPa, 190 MPa, 200 MPa, 210 MPa, 220 MPa, 230 MPa, 240 MPa, 250 MPa, 260 MPa, 270 MPa, 280 MPa, 290 MPa, 300 MPa, 310 MPa, 320 MPa, 330 MPa, 340 MPa, 350 MPa, 360 MPa, 370 MPa, 380 MPa, 390 MPa, 400 MPa, 410 MPa, 420 MPa, 430 MPa, 440 MPa, 450 MPa, 460 MPa, 470 MPa, 480 MPa, 490 MPa, or 500 MPa, and, in an embodiment, 60 MPa to 200 MPa, and, in an embodiment, 100 MPa to 200 MPa.

In an embodiment, the base layer 100 may have a fracture elongation of 200% or more, for example, 200% to 800%, as measured at 25° C. Within this range, the base layer can assist in securing flexural reliability of the multilayer adhesive sheet.

In an embodiment, the base layer 100 may have a haze of 1% or less, for example, 0%, 0.1%, 0.2%, 0.3. 0.4%, 0.5%, 0.6%, 0.7%, 0.8%, 0.9%, or 1%, and, in an embodiment, 0% to 0.5%, at a wavelength of 380 nm to 780 nm, as measured by a haze meter in accordance with ASTM D 1003-95 5 ("Standard Test for Haze and Luminous Transmittance of Transparent Plastic"). Within this range, the base layer can secure good external appearance of the multilayer adhesive sheet without generation of gel and opaqueness. The base layer 100 does not suffer from generation of stripe patterns, gel, and/or opaqueness upon irradiation with light at a wavelength of 380 nm to 780 nm, as observed with the naked eye or a microscope.

In an embodiment, the base layer 100 may have an index of refraction of 1.4 to 1.7, and, in an embodiment, 1.45 to 1.65. Within this range, the base layer can exhibit good optical characteristics without increase in haze when the first and second adhesive layers are stacked thereon.

In an embodiment, the base layer 100 has a smaller thickness than each of the first adhesive layer 110 and the second adhesive layer 120 or the entirety thereof, thereby facilitating realization of the advantageous effects of the invention. In an embodiment, the base layer 100 may have a thickness of greater than 0 μm to 100 μm, and, in an embodiment, 5 μm to 50 μm, or 10 μm to 20 μm. Within this range, the base layer 100 can realize a thin multilayer adhesive sheet while facilitating realization of the advantageous effects of the invention.

In an embodiment, the thickness of the base layer 100 may be in a range of 10% to 90%, for example, 10%, 15%, 20%, 25%, 30%, 35%, 40%, 45%, 50%, 55%, 60%, 65%, 70%, 75%, 80%, 85%, or 90%, and, in an embodiment, 10% to 50%, of the entire thickness of the first adhesive layer 110 and the second adhesive layer 120. Within this range, the base layer 100 can easily realize the advantageous effects of the invention.

The inventors of the present invention could improve the effects of absorption and distribution of external impact through adjustment in tensile modulus of the laminate of the first adhesive layer, the base layer, and the second adhesive layer at 25° C. In an embodiment, the laminate of the first adhesive layer, the base layer, and the second adhesive layer, that is, the multilayer adhesive sheet, may have a tensile modulus at 25° C. of 0.05 GPa to 2 GPa, for example, 0.05 GPa, 0.1 GPa, 0.15 GPa, 0.2 GPa, 0.25 GPa, 0.3 GPa, 0.35 GPa, 0.4 GPa, 0.45 GPa, 0.5 GPa, 0.55 GPa, 0.6 GPa, 0.65 GPa, 0.7 GPa, 0.75 GPa, 0.8 GPa, 0.85 GPa, 0.9 GPa, 0.95 GPa, 1 GPa, or 2 GPa, and, in an embodiment, 0.1 GPa to 0.2 GPa. Within this range of tensile modulus, the multilayer adhesive sheet can improve foldability, the effects of absorption and distribution of external impact, and punchability while improving flexural reliability.

First Adhesive Layer

The first adhesive layer 110 is stacked on an upper surface of the base layer 100 to allow adhesion of an optical element to the multilayer adhesive sheet in a display apparatus. In an embodiment, the first adhesive layer 110 may allow adhesion of a window film to the multilayer adhesive sheet. The window film exhibits foldable characteristics and may include ultrathin glass or a plastic film, such as a polyimide film and the like.

In an embodiment, the first adhesive layer 110 may have a storage modulus of 10 kPa to 500 kPa, and, in an embodiment, 10 kPa to 150 kPa, at −20° C. Within this range, the first adhesive layer 110 can improve flexural reliability of the multilayer adhesive sheet at low temperature while maintaining bonding strength to the base layer 100.

In an embodiment, the first adhesive layer 110 may have a storage modulus of 10 kPa to 100 kPa, and, in an embodiment, 10 kPa to 50 kPa, at 60° C. Within this range, the first adhesive layer 110 can improve flexural reliability of the multilayer adhesive sheet at high temperature while maintaining bonding strength to the base layer 100.

In an embodiment, the first adhesive layer 110 may have an index of refraction of 1.45 to 1.7, and, in an embodiment, 1.45 to 1.65. Within this range, the first adhesive layer 110 can have a suitable index of refraction to secure good external appearance, as compared to the base layer 100.

In an embodiment, the first adhesive layer 110 may have a thickness of 10 μm to 50 μm, and, in an embodiment, 20 μm to 50 μm. Within this range, the first adhesive layer 110 can be used in the multilayer adhesive sheet without affecting flexibility of the multilayer adhesive sheet.

In an embodiment, the first adhesive layer 110 may include a layer formed of an adhesive composition including at least one selected from among a (meth)acrylic adhesive resin, a silicone-based adhesive resin, and a urethane-based adhesive resin. In an embodiment, the first adhesive layer is a pressure-sensitive adhesive (PSA) film and is formed of an adhesive composition including a (meth)acrylic adhesive resin in terms of ease of supply and manufacture, good external appearance, and flexural reliability.

The first adhesive layer 110 may be formed of the adhesive composition through photocuring, heat curing, or a combination of photocuring and heat curing. Each of photocuring and heat curing may be performed by a typical method known to those skilled in the art.

In an embodiment, the first adhesive layer 110 may include a (meth)acrylic adhesive layer formed of an adhesive composition including a monomer mixture for a hydroxyl group-containing (meth)acrylic copolymer; particles or a particle mixture including at least one selected from among organic particles and inorganic particles; and an initiator. In an embodiment, the first adhesive layer 110 may be free from an epoxy-based component.

The monomer mixture may include a hydroxyl group-containing (meth)acrylate; and a comonomer including at least one selected from among an alkyl group-containing (meth)acrylate, an ethylene oxide-containing monomer, a propylene oxide-containing monomer, an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing (meth)acrylate.

The hydroxyl group-containing (meth)acrylate may include at least one selected from among 2-hydroxyethyl (meth)acrylate, 2-hydroxypropyl (meth)acrylate, 3-hydroxypropyl(meth)acrylate, 2-hydroxybutyl (meth)acrylate, 4-hydroxybutyl (meth)acrylate, 6-hydroxyhexyl (meth) acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth) acrylate, 2-hydroxy-3-phenyloxypropyl (meth)acrylate, 4-hydroxycyclopentyl (meth)acrylate, 4-hydroxycyclohexyl (meth)acrylate, and cyclohexanedimethanol mono(meth) acrylate.

The alkyl group-containing (meth)acrylate may include an unsubstituted C1 to C20 linear or branched alkyl (meth) acrylic acid ester. For example, the alkyl group-containing (meth)acrylate may include at least one selected from among methyl (meth)acrylate, ethyl (meth)acrylate, propyl (meth) acrylate, n-butyl (meth)acrylate, t-butyl (meth)acrylate, iso-butyl (meth)acrylate, pentyl (meth)acrylate, hexyl (meth) acrylate, heptyl (meth)acrylate, ethylhexyl (meth)acrylate, octyl (meth)acrylate, iso-octyl (meth)acrylate, nonyl (meth) acrylate, decyl (meth)acrylate, lauryl (meth)acrylate, and isobornyl (meth)acrylate.

Each of the ethylene oxide-containing monomer, the propylene oxide-containing monomer, the amine group-containing monomer, the alkoxy group-containing monomer, the phosphoric acid group-containing monomer, the sulfonic acid group-containing monomer, the phenyl group-containing monomer, the silane group-containing monomer, the carboxylic acid group-containing monomer, and the amide group-containing (meth)acrylate may be selected from typical compounds well known to those skilled in the art.

In an embodiment, the monomer mixture includes 1% by weight (wt %) to 40 wt %, and, in an embodiment, 10 wt % to 30 wt %, of the hydroxyl group-containing (meth)acrylate, and 60 wt % to 95 wt %, and, in an embodiment, 70 wt % to 90 wt %, of the comonomer. Within this range, the monomer mixture can improve adhesive properties of the adhesive layer and flexibility at high temperature and low temperature.

In the first adhesive layer 110, the particles can improve flexibility of the multilayer adhesive sheet at low temperature and/or high temperature or can assist in remarkable improvement in impact resistance of the multilayer adhesive sheet.

The organic particles can further improve reliability of the multilayer adhesive sheet at high temperature by controlling modulus of the adhesive layer at high temperature to prevent or substantially prevent peeling, lifting, and/or bubble generation in the adhesive layer at high temperature. Organic nanoparticles have a high glass transition temperature to improve modulus of the adhesive layer at high temperature.

In an embodiment, the organic particles may have an average particle diameter of 10 nm to 400 nm, and, in an embodiment, 10 nm to 300 nm, and, in an embodiment, 30 nm to 280 nm, and, in an embodiment, 50 nm to 280 nm. Within this range, the organic particles do not affect foldability of the adhesive layer and have a total luminous transmittance of 90% or more in the visible spectrum to secure good transparency of the adhesive layer.

The organic particles may have a core-shell structure or a simple structure, such as bead type nanoparticles, without being limited thereto. In an embodiment, the organic particles have a core-shell structure to improve folding reliability of the multilayer adhesive sheet at both low temperature and high temperature. The core and the shell satisfy the following Relation (1). That is, both the core and the shell may be organic particles. With the organic particles having the core-shell structure, the adhesive layer can exhibit good foldability and balance between elasticity and flexibility:

$$Tg(c) < Tg(s), \qquad \text{[Relation (1)]}$$

where Tg(c) is the glass transition temperature (unit: ° C.) of the core and Tg(s) is the glass transition temperature (unit: ° C.) of the shell.

In an embodiment, the core may have a glass transition temperature of about −150° C. to 10° C., and, in an embodiment, about −150° C. to about −5° C., and, in an embodiment, about −150° C. to about −20° C. Within this range, the adhesive layer can have good viscoelasticity at low temperature and/or room temperature. The core may include at least one selected from among poly(alkyl (meth)acrylate), polysiloxane and polybutadiene each having the above glass transition temperature. The poly(alkyl (meth)acrylate) may include at least one selected from among poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), poly (ethylhexyl methacrylate), and polysiloxane, without being limited thereto.

In an embodiment, the shell may have a glass transition temperature of about 15° C. to about 150° C., and, in an embodiment, about 35° C. to about 150° C., and, in an embodiment, about 50° C. to about 140° C. Within this range, the organic nanoparticles can exhibit good dispersion in the (meth)acrylic copolymer. The shell may include poly(alkyl methacrylate) having the above glass transition temperature. For example, the shell may include at least one selected from among poly(methyl methacrylate) (PMMA), poly(ethyl methacrylate), poly(propyl methacrylate), poly (butyl methacrylate), poly(isopropyl methacrylate), poly (isobutyl methacrylate), and poly(cyclohexyl methacrylate), without being limited thereto.

In an embodiment, in the organic particles, the core may be present in an amount of 30 wt % to 99 wt %, and, in an embodiment, 40 wt % to 95 wt %, and, in an embodiment, 50 wt % to 90 wt %. Within this range, the adhesive layer can exhibit good foldability in a broad temperature range. In an embodiment, in the organic particles, the shell may be present in an amount of 1 wt % to 70 wt %, and, in an embodiment, 5 wt % to 60 wt %, and, in an embodiment, 10 wt % to 50 wt %. Within this range, the adhesive layer can exhibit good foldability in a broad temperature range.

In an embodiment, the organic particles may be optionally present in an amount of about 20 parts by weight or less, and, in an embodiment, 0.1 parts by weight to 20 parts by weight, 0.5 parts by weight to 10 parts by weight, or 0.5 parts by weight to 8 parts by weight, relative to 100 parts by weight of the monomer mixture including the hydroxyl group-containing (meth)acrylate and the comonomer. Within this range, the organic particles can secure good properties in terms of modulus of the adhesive layer at high temperature, foldability of the adhesive layer at room temperature and high temperature, and viscoelasticity of the adhesive layer at low temperature and/or room temperature.

The inorganic particles are formed of an inorganic material and can assist in improvement in impact resistance of the multilayer adhesive sheet. The inorganic particles may include, for example, any of metal oxides, such as silica, zirconia, and the like, metal titanates, such as barium titanate and the like, sulfates, selenides, and tellurides. In an embodiment, the inorganic particles include silica to improve impact resistance while preventing or substantially preventing increase in haze of the adhesive film by reducing a difference in index of refraction between the inorganic particles and the adhesive resin forming the adhesive layer.

In an embodiment, the inorganic particles may include inorganic particles having a smaller average particle diameter than the organic particles. As a result, the inorganic particles can easily realize the effects of the present invention. In an embodiment, the inorganic particles are nanoparticles and may have an average particle diameter (D50) of 10 nm to 200 nm, and, in an embodiment, 10 nm to 150 nm, and, in an embodiment, 10 nm to 100 nm. Within this range, the inorganic particles can improve impact resistance of the multilayer adhesive sheet without affecting foldability of the multilayer adhesive sheet and can have a total luminous transmittance of 90% or more and a haze of less than 1% in the visible spectrum to secure good transparency of the adhesive layer.

In an embodiment, the inorganic particles may be optionally present in an amount of about 20 parts by weight or less, and, in an embodiment, 0.1 parts by weight to 20 parts by weight, 0.5 parts by weight to 10 parts by weight, or 0.5 parts by weight to 8 parts by weight, relative to 100 parts by weight of the monomer mixture including the hydroxyl group-containing (meth)acrylate and the comonomer. Within this range, the inorganic particles can significantly improve impact resistance of the multilayer adhesive sheet without affecting flexibility of the multilayer adhesive sheet.

The initiator may include a photoinitiator and/or a heat initiator. In an embodiment, the initiator includes a photoinitiator to secure surface uniformity of the first adhesive layer by blocking shrinkage upon curing of the adhesive composition.

The initiator may include an acetophenone compound, a benzyl ketal type compound, or a mixture thereof, without being limited thereto. In an embodiment, the initiator is an acetophenone compound and is selected from among 2,2-dimethoxy-2-phenyl acetophenone, 2,2'-diethoxy acetophenone, 2,2'-dibuthoxy acetophenone, 2-hydroxy-2-methyl propiophenone, p-t-butyl trichloroacetophenone, p-t-butyl dichloroacetophenone, 4-chloroacetophenone, 2,2'-dichloro-4-phenoxy acetophenone, 2-methyl-1-(4-(methyl-thio)phenyl)-2-morpholinopropane-1-one, 2-benzyl-2-dimethylamino-1-(4-morpholinophenyl)-butane-1-one, and mixtures thereof.

In an embodiment, the initiator may be present in an amount of 0.001 parts by weight to 10 parts by weight, and, in an embodiment, 0.001 parts by weight to 5 parts by weight, relative to 100 parts by weight of the monomer mixture including the hydroxyl group-containing (meth) acrylate and the comonomer. Within this range, the initiator allows formation of the adhesive layer while preventing or substantially preventing deterioration in transparency of the multilayer adhesive sheet.

In an embodiment, the adhesive composition may further include a silicone-based (meth)acrylate. The silicone-based (meth)acrylate can improve foldability and adhesion of the adhesive layer to the base layer by improving wettability of the adhesive layer to the base layer.

The silicone-based (meth)acrylate is a siloxane-modified mono-functional or polyfunctional (meth)acrylate and may be obtained from typical products well-known to those skilled in the art. For example, the silicone-based (meth) acrylate may include a modified silicone having a (meth) acrylate group at one end thereof and/or a modified silicone having a (meth)acrylate group at both ends thereof.

In an embodiment, the silicone-based (meth)acrylate may be present in an amount of about 5 parts by weight or less, for example, about 0.001 parts by weight to about 5 parts by weight, and, in an embodiment, 0.001 parts by weight to 3 parts by weight, relative to 100 parts by weight of the monomer mixture including the hydroxyl group-containing (meth)acrylate and the comonomer. Within this range, the adhesive layer can improve wettability with respect to the base layer.

In an embodiment, the adhesive composition may further include a crosslinking agent and a silane coupling agent. The crosslinking agent may include a bi- to hexa-functional (meth)acrylate-based photocurable monomer. Details thereof are well-known to those skilled in the art. In an embodiment, each of the crosslinking agent and the silane coupling agent may be present in an amount of 10 parts by weight or less relative to 100 parts by weigh of monomer mixture including the hydroxyl group-containing (meth) acrylate and the comonomer.

Second Adhesive Layer

The second adhesive layer 120 may be stacked on a lower surface of the base layer 100 to allow adhesion of an optical element to the multilayer adhesive sheet in a display apparatus. In an embodiment, the second adhesive layer 120 may allow adhesion of an element for the display apparatus, for example, an organic light emitting element or a polarizing plate, to the multilayer adhesive sheet.

The second adhesive layer 120 may have the same storage modulus as or a different storage modulus than the first adhesive layer 110 at −20° C., and, in an embodiment, may have a storage modulus at −20° C. of 10 kPa to 500 kPa, and, in an embodiment, 10 kPa to 150 kPa. Within this range, the second adhesive layer 120 can improve flexural reliability at low temperature while maintaining adhesive strength to the base layer 100.

The second adhesive layer 120 may have the same storage modulus as or a different storage modulus than the first adhesive layer 110 at 60° C., and, in an embodiment, may have a storage modulus at 60° C. of 10 kPa to 100 kPa, and, in an embodiment, 10 kPa to 50 kPa. Within this range, the second adhesive layer 120 can improve flexural reliability at high temperature while maintaining adhesive strength to the base layer 100.

In an embodiment, the second adhesive layer 120 is a hard type adhesive layer having higher storage modulus at 25° C. than the first adhesive layer 110. As a result, it is possible to prevent or substantially prevent problems upon punching due to low modulus of the adhesive layer at room temperature.

The second adhesive layer 120 may have the same index of refraction as or a different index of refraction than the first adhesive layer 110 and, in an embodiment, may have an index of refraction of 1.45 to 1.65, and, in an embodiment, 1.45 to 1.55. Within this range, the second adhesive layer

120 can have a suitable index of refraction to secure good external appearance, as compared to the base layer 100.

The second adhesive layer 120 may have the same thickness as or a different thickness than the first adhesive layer 110 and, in an embodiment, may have a thickness of 10 μm to 50 μm, and, in an embodiment, 20 μm to 50 μm. Within this range, the second adhesive layer 120 can be used in the multilayer adhesive sheet without affecting flexibility of the multilayer adhesive sheet. In an embodiment, a thickness ratio of the first adhesive layer 110 to the second adhesive layer 120 may be in a range of 1:0.5 to 1:5, for example, 1:0.5, 1:0.7, 1:0.9, 1:1, 1:2, 1:3, 1:4, or 1:5.

The second adhesive layer 120 may include a layer formed of an adhesive composition including at least one selected from among a (meth)acrylic adhesive resin, a silicone-based adhesive resin, and a urethane-based adhesive resin. In an embodiment, the second adhesive layer is a pressure-sensitive adhesive (PSA) film and is formed of an adhesive composition including a (meth)acrylic adhesive resin in terms of ease of supply and manufacture, good external appearance, and flexural reliability. In an embodiment, the second adhesive layer 120 may be free from an epoxy component.

The second adhesive layer 120 may be formed of the adhesive composition through photocuring, heat curing, or a combination of photocuring and heat curing. Each of photocuring and heat curing may be performed by a typical method known to those skilled in the art.

In an embodiment, the second adhesive layer 120 may include a (meth)acrylic adhesive layer formed of an adhesive composition including a monomer mixture for a hydroxyl group-containing (meth)acrylic copolymer; particles or a particle mixture including at least one selected from among organic particles and inorganic particles; and an initiator. The monomer mixture may include a hydroxyl group-containing (meth)acrylate; and a comonomer including at least one selected from among an alkyl group-containing (meth)acrylate, an ethylene oxide-containing monomer, a propylene oxide-containing monomer, an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing (meth)acrylate.

In an embodiment, the hydroxyl group-containing (meth) acrylate, the comonomer, the organic particles, the inorganic particles, and the initiator are substantially the same as those of the first adhesive layer 110 described above. In an embodiment, the monomer mixture includes 1 wt % to 40 wt %, and, in an embodiment, 10 wt % to 30 wt %, of the hydroxyl group-containing (meth)acrylate, and 60 wt % to 95 wt %, and, in an embodiment, 70 wt % to 90 wt % of the comonomer. Within this range, the monomer mixture can improve adhesive properties of the adhesive layer and flexibility at high temperature and low temperature. In an embodiment, each of the organic particles, the inorganic particles, and the initiator may be present in the same amount as in the first adhesive layer 110 relative to 100 parts by weight of the monomer mixture including hydroxyl group-containing (meth)acrylate and the comonomer. In an embodiment, the silicone-based (meth)acrylate, the crosslinking agent, and the silane coupling agent are substantially the same as those of the first adhesive layer 110. In an embodiment, each of the silicone-based (meth)acrylate, the crosslinking agent, and the silane coupling agent may be present in the same amount as in the first adhesive layer 110 relative to 100 parts by weight of the hydroxyl group-containing (meth)acrylate and the comonomer.

In an embodiment, the multilayer adhesive sheet may be manufactured by separately manufacturing the first adhesive layer and the second adhesive layer, followed by stacking the first adhesive layer and the second adhesive layer on upper and lower surfaces of the base layer, respectively. In another embodiment, the multilayer adhesive sheet may be manufactured by directly coating a composition for the first adhesive layer on the upper surface of the base layer, curing the composition for the first adhesive layer to form the first adhesive layer, directly coating a composition for the second adhesive layer on the lower surface of the base layer, and curing the composition for the second adhesive layer to form the second adhesive layer.

An optical member according to one or more embodiments of the present invention includes the multilayer adhesive sheet according to an embodiment of the present invention.

In an embodiment, the optical member may include an optical element and the multilayer adhesive sheet according to an embodiment of the present invention stacked on at least one surface of the optical element.

The optical element may include any of various optical components including a plastic plate or a glass plate, which is included in a display apparatus. For example, the multilayer adhesive sheet according to an embodiment of the present invention includes the adhesive layers on opposite surfaces of the base layer and thus may be used to attach different optical elements thereto.

Figure 2:
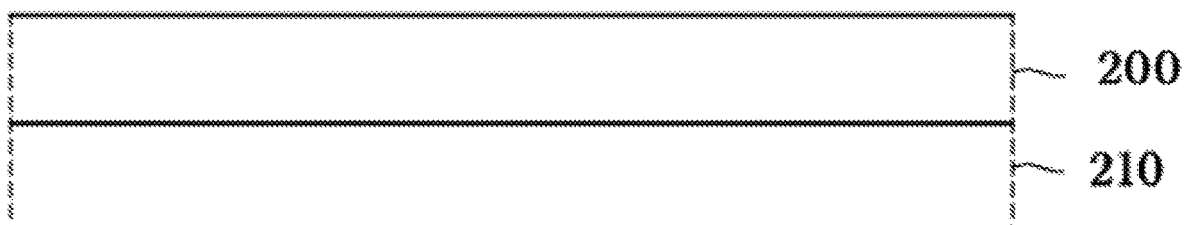
FIG. 2 is a cross-sectional view of an optical member according to an embodiment of the present invention.

FIG. 2 is a cross-sectional view of an optical member according to an embodiment of the present invention. Referring to FIG. 2, in an embodiment, an optical member includes a window 200 and a multilayer adhesive sheet 210 according to an embodiment of the present invention stacked on a lower surface of the window 200.

The window 200 (e.g., a window film) may include a plastic film, such as any of a polyimide film and the like, and a glass plate, such as ultrathin glass (UTG) and the like, without being limited thereto.

A display apparatus according to an embodiment of the present invention includes the multilayer adhesive sheet according to an embodiment of the present invention. The display apparatus may include a flexible display apparatus or a non-flexible display apparatus.

In an embodiment, the display apparatus may include an optical element and the multilayer adhesive sheet according to an embodiment of the present invention stacked on at least one surface of the optical element.

The display apparatus may further include a display drive unit for driving the display apparatus. The display drive unit may include optical elements including any of an organic light emitting diode (OLED), an LED, a quantum dot light emitting diode (QLED), an LCD element, and a quantum dot element. The display drive unit may further include a substrate for maintaining the optical elements.

In an embodiment, the display apparatus may further include a polarizing plate. The polarizing plate can realize the display apparatus or increase contrast ratio of the display apparatus through polarization of internal light or by preventing or substantially preventing reflection of external light. In an embodiment, the polarizing plate may be composed of a polarizer alone. In another embodiment, the polarizing plate may include a polarizer and a protective film on one or both surfaces of the polarizer. In another embodiment, the polarizing plate may include a polarizer and a protective coating layer on one or both surfaces of the polarizer. Each of the polarizer, the protective film and the protective coating layer may be obtained from typical products well-known to those skilled in the art.

In an embodiment, the display apparatus may further include a touchscreen panel. When touched by a conductor, such as a human body or a stylus, the touchscreen panel may generate electrical signals through detection of variation in capacitance, whereby the display drive unit can be driven in response to the electrical signals.

Next, the present invention will be described in further detail with reference to some examples. However, it should be noted that these examples are provided for illustration and are not to be construed in any way as limiting the present invention.

Example 1

(1) Preparation of Composition for First Adhesive Layer

Organic nanoparticles were prepared by emulsion polymerization. The organic nanoparticles had a core-shell structure in which the cores were formed of poly(butyl acrylate) and the shells were formed of poly(methyl methacrylate), and had an average particle diameter of 200 nm and an index of refraction of 1.48.

100 parts by weight of a monomer mixture comprising 20 parts by weight of 4-hydroxybutyl acrylate and 80 parts by weight of 2-ethylhexyl acrylate, and 0.03 parts by weight of an initiator (Irgacure 651, 2,2-dimethoxy-2-phenylacetophenone, BASF) were mixed in a reactor. After replacing dissolved oxygen in the reactor with nitrogen gas, the mixture was partially polymerized through UV irradiation using a low pressure mercury lamp, thereby preparing a viscous liquid having a viscosity of 5,000 cP at 25° C.

In terms of solid content, 0.5 parts by weight of an initiator (Irgacure 184, 1-hydroxycyclohexylphenylketone, BASF) and 5 parts by weight of the organic nanoparticles were added to the reactor and mixed with the viscous liquid to prepare a composition for the first adhesive layer.

The composition was deposited onto one surface of a release film (polyethylene terephthalate film) and was irradiated with UV light at a dose of 2,000 mJ/cm², thereby preparing an adhesive sheet of a 25 µm thick first adhesive layer and the PET film. The first adhesive layer had a storage modulus of 90 kPa at −20° C. and a storage modulus of 30 kPa at 60° C. The storage modulus was measured using a dynamic viscoelastic instrument (ARES G2, TA Instrument) by the method described below.

(2) Preparation of Composition for Second Adhesive Layer

A composition for a second adhesive layer was prepared in the same manner as in preparation of the composition for the first adhesive layer. The second adhesive layer had a storage modulus of 90 kPa at −20° C. and a storage modulus of 30 kPa at 60° C. The storage modulus was measured using a dynamic viscoelastic instrument (ARES G2, TA Instrument) by the method described below.

(3) Preparation of Multilayer Adhesive Sheet

The composition for the first adhesive layer was coated onto an upper surface of a polyurethane-based film (prepared by solution casting method, thickness: 10 µm) used as a base layer, and irradiated with UV light at 2,000 mJ/cm² to form the first adhesive layer (thickness: 25 µm) on the upper surface of the base layer. Thereafter, the composition for the second adhesive layer was coated onto a lower surface of the polyurethane film and was irradiated with UV light at 2,000 mJ/cm² to form the second adhesive layer (thickness: 25 µm) on the lower surface of the base layer, thereby preparing a multilayer adhesive sheet.

Examples 2 to 6

Multilayer adhesive sheets were prepared in the same manner as in Example 1 except that the modulus and/or the thickness of the polyurethane film, the thickness of the first adhesive layer, and the thickness of the second adhesive layer were changed as listed in Table 1.

Comparative Example 1

An adhesive composition was prepared in the same manner as in preparation of the composition for the first adhesive layer in Example 1. The prepared adhesive composition was deposited on one surface of a release film (polyethylene terephthalate film) and was irradiated with UV light at 2,000 mJ/cm², thereby preparing an adhesive sheet of a 100 µm thick adhesive layer and the PET film. The adhesive layer had a storage modulus of 90 kPa at −20° C. and a storage modulus of 30 kPa at 60° C. The storage modulus was measured using a dynamic viscoelastic instrument (ARES G2, TA Instrument) by the method described below.

Comparative Example 2

An adhesive layer was formed substantially in the same manner as in Comparative Example 1, except that the thickness of the adhesive layer was changed as listed in Table 1.

Comparative Example 3

A multilayer adhesive was manufactured substantially in the same manner as in Example 1, except that a polyurethane film (manufactured by solution casting, thickness: 20 µm) of Table 1 was used as the base layer instead of the polyurethane film of Table 1.

Comparative Example 4

A multilayer adhesive was manufactured substantially in the same manner as in Example 1, except that a thermoplastic polyurethane (TPU) film (manufactured by a method other than solution casting, thickness: 10 µm) of Table 1 was used as the base layer instead of the polyurethane film of Table 1.

The multilayer adhesive sheets of the Examples and Comparative Examples were evaluated as to the following properties, and results are shown in Table 1.

(1) Young's modulus of base layer (unit: MPa): Young's modulus at 25° C. was evaluated with respect to the base layer of each of the multilayer adhesive sheets of the Examples and Comparative Examples. Young's modulus was evaluated using a V-type specimen in accordance with ASTM D638. Specifically, Young's modulus was evaluated at 100 mm/min using a UTM system (Intron Technology Co., Ltd.) through a tensile test experiment.

(2) Storage modulus of base layer (unit: MPa): Storage moduli at −20° C. and at 85° C. were evaluated with respect to the base layer of each of the multilayer adhesive sheets prepared in the Examples and Comparative Examples. Storage modulus was measured using a dynamic mechanical analyzer (DMA) system. Specifically, the storage moduli at −20° C. and at 85° C. were measured in a tension test mode at a frequency of 1 Hz while raising the temperature from −70° C. to 120° C. at a heating rate: 2° C./min.

(3) Tensile modulus (unit: GPa): Tensile modulus 25° C. was evaluated with respect to each of the multilayer adhesive sheets prepared in the Examples and Comparative Examples (with respect to each of the adhesive layers of Comparative Examples 1 and 2). Tensile modulus was measured in the same manner as in measurement of Young's modulus of the base layer.

(4) Flexural reliability: A specimen (length×width: 10 cm×5 cm) was prepared by stacking a polyethylene terephthalate film (thickness: 75 μm) on a lower surface of the multilayer adhesive sheet of each of the surface protective films prepared in the Examples and Comparative Examples. The specimen was evaluated at −20° C. and 60° C. as to generation of cracks at a bent portion of the specimen upon repetition of 100,000 cycles of folding and unfolding the specimen at the polyethylene terephthalate film side such that a bent portion of the specimen had a radius of curvature

18 glass in an actual foldable panel, and could be confirmed through a magnifying lens or an optical microscope. A higher initial height indicates better pen-drop impact resistance.

(6) Appearance: Upon observation of appearance of each of the multilayer adhesive sheets prepared in the Examples and Comparative Examples (with respect to each of the adhesive layers of Comparative Examples 1 and 2) at first adhesive layer side with the naked eye by irradiating the multilayer adhesive sheet with light from a Xenon lantern, generation of no stripe patterns, gel, and/or opaqueness on the entirety of the multilayer adhesive sheet was rated as ○, and even slight generation of stripe patterns, gel, and/or opaqueness thereon was rated as X.

(7) Haze (unit: %): Haze was measured with respect to each of the multilayer adhesive sheets prepared in the Examples and Comparative Examples (with respect to each of the adhesive layers of Comparative Examples 1 and 2) using a haze meter (NDH 2000).

TABLE 1

|  |  | Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| First adhesive layer | Storage modulus at −20° C. (MPa) | 0.09 | 0.09 | 0.09 | 0.09 | 0.09 | 0.09 | 0.09 | 0.09 | 0.09 | 0.09 |
|  | Thickness (μm) | 25 | 25 | 35 | 50 | 50 | 35 | 100 | 50 | 25 | 25 |
| Base layer | Young's modulus at 25° C. (MPa) | 104 | 110 | 110 | 110 | 110 | 110 | — | — | 70 | 70 |
|  | Storage modulus at −20° C. (MPa) | 1100 | 1014 | 1014 | 1014 | 1014 | 1014 | — | — | 1800 | 800 |
|  | Storage modulus at 85° C. (MPa) | 53 | 59 | 59 | 59 | 59 | 59 | — | — | 28 | 5 |
|  | Thickness (μm) | 10 | 20 | 20 | 20 | 20 | 20 | — | — | 20 | 10 |
| Second adhesive layer | Storage modulus at −20° C. (MPa) | 0.09 | 0.09 | 0.09 | 0.09 | 0.09 | 0.09 | — | — | 0.09 | 0.09 |
|  | Thickness (μm) | 25 | 25 | 25 | 25 | 50 | 35 | — | — | 25 | 25 |
| Adhesive sheet | Tensile modulus at 25° C. (GPa) | 0.11 | 0.14 | 0.12 | 0.12 | 0.12 | 0.12 | $9 \times 10^{-5}$ | $9 \times 10^{-5}$ | 0.09 | 0.09 |
| Flexural reliability | at −20° C. | ○ | ○ | ○ | ○ | ○ | ○ | ○ | ○ | Buckling | ○ |
|  | at 60° C. | ○ | ○ | ○ | ○ | ○ | ○ | ○ | ○ | Lifting | Lifting, bubbling |
| Total thickness of multilayer adhesive sheet (μm) |  | 60 | 70 | 80 | 95 | 120 | 90 | 100 | 50 | 70 | 60 |
| Pen drop impact resistance (cm) |  | 6.5 | 7 | 7.5 | 8 | 9 | 7.8 | 5 | 3 | 6.5 | 4 |
| Appearance |  | ○ | ○ | ○ | ○ | ○ | ○ | ○ | ○ | ○ | X |
| Haze |  | 0.7 | 0.6 | 0.6 | 0.6 | 0.7 | 0.6 | 0.4 | 0.4 | 0.6 | 0.5 | of 1.5 mm, in which each cycle refers to an operation of folding the specimen in half in the longitudinal direction thereof, followed by unfolding the specimen. Generation of no cracks even after 100,000 cycles of folding and unfolding was rated as ○, generation of cracks once was rated as A, and generation of cracks twice or more was rated as X.

(5) Pen-drop impact resistance (unit: cm): A specimen was prepared by sequentially stacking a polyethylene terephthalate (PET) film (thickness: 38 μm), an adhesive film (thickness: 25 μm, storage modulus of 0.03 MPa at 25° C.) and a PET film (thickness: 125 μm) on a lower surface of the second adhesive layer of each of the multilayer adhesive sheets prepared in the Examples and Comparative Examples. A ball-point pen (BIC Co., Ltd., crystal material, φ0.7 mm pen) was dropped from a predetermined height above the first adhesive layer of the specimen to evaluate an initial height at which dents were formed on the lowermost PET film (thickness: 125 μm). The maximum height at which dents were formed thereon was evaluated for simulation or comparison of a height of a bright spot where a pixel would be broken and a breaking height of a window As shown in Table 1, the multilayer adhesive sheets of the Examples exhibited good flexural reliability at both low temperature and high temperature, good effects in absorption and distribution of external impact, low haze to have good optical characteristics, and good appearance.

Accordingly, embodiments of the present invention provide a multilayer adhesive sheet that has good flexural reliability at low temperature and high temperature. Further, embodiments of the present invention provide a multilayer adhesive sheet that secures good effects in absorption and distribution of external impact while exhibiting good impact resistance. Further, embodiments of the present invention provide a multilayer adhesive sheet that has good punchability or cuttability. Further, embodiments of the present invention provide a multilayer adhesive sheet that has low haze to secure good optical characteristics. Further, embodiments of the present invention provide a multilayer adhesive sheet that has good appearance.

Conversely, the adhesive layers of Comparative Examples 1 and 2 exhibited poor impact resistance. The multilayer adhesive sheet of Comparative Example 3, which failed to satisfy modulus of the base layer within the range of the present invention, suffered from generation of cracks at both low temperature and high temperature, and exhibited poor flexural reliability. The multilayer adhesive sheet of Comparative Example 4, which failed to satisfy modulus of the base layer within the range of the present invention and was prepared using a polyurethane film formed by a method other than solution casting, exhibited poor appearance and suffered from generation of cracks, lifting, and bubbles at high temperature to provide poor flexural reliability at high temperature.

While some embodiments of the present invention have been described herein, it will be understood by those skilled in the art that various modifications, changes, alterations, and equivalent embodiments may be made without departing from the spirit and scope of the invention.

What is claimed is:

1. A multilayer adhesive sheet comprising: a base layer; a first adhesive layer stacked on a surface of the base layer; and a second adhesive layer stacked on another surface of the base layer, wherein the base layer comprises a polyurethane-based film manufactured by solution casting and has a storage modulus of 700 MPa to 1,500 MPa at −20° C. and a storage modulus of 10 MPa to 100 MPa at 85° C., wherein the base layer has a thickness of 10 μm to 20 μm, wherein a laminate of the first adhesive layer, the base layer, and the second adhesive layer has a tensile modulus of 0.12 GPa to 0.2 GPa at 25° C., wherein the first adhesive layer is formed of an adhesive composition comprising a monomer mixture for a hydroxyl group-containing (meth)acrylic copolymer; particles or a particle mixture comprising at least one selected from among organic particles and inorganic particles; and an initiator, and the second adhesive layer is formed of an adhesive composition comprising a monomer mixture for a hydroxyl group-containing (meth)acrylic copolymer; particles or a particle mixture comprising at least one selected from among organic particles and inorganic particles; and an initiator, and the first adhesive layer has a storage modulus of 10 kPa to 500 kPa at −20° C. and a storage modulus of 10 kPa to 100 kPa at 60° C., and the second adhesive layer has a storage modulus of 10 kPa to 500 kPa at −20° C. and a storage modulus of 10 kPa to 100 kPa at 60° C.

2. The multilayer adhesive sheet according to claim 1, wherein the base layer has a Young's modulus of 50 MPa to 500 MPa at 25° C.

3. The multilayer adhesive sheet according to claim 1, wherein each of the first adhesive layer and the second adhesive layer has a thickness of 10 μm to 50 μm.

4. The multilayer adhesive sheet according to claim 1, wherein a tensile modulus of the base layer at 25° C. is 75% to 200% of the tensile modulus of the laminate of the first adhesive layer, the base layer, and the second adhesive layer at 25° C.

5. The multilayer adhesive sheet according to claim 1, wherein the multilayer adhesive sheet has a pen-drop impact resistance of 5.5 cm or greater.

6. The multilayer adhesive sheet according to claim 1, wherein the thickness of the base layer is 10% to 90% of an entire thickness of the first adhesive layer and the second adhesive layer.

7. The multilayer adhesive sheet according to claim 6, wherein the thickness of the base layer is 10% to 50% of the entire thickness of the first adhesive layer and the second adhesive layer.

8. An optical member comprising:
an optical element; and
the multilayer adhesive sheet according to claim 1 stacked on a surface of the optical element.

9. The optical member according to claim 8, wherein the optical element comprises a plastic plate or a glass plate.

10. A display apparatus comprising the multilayer adhesive sheet according to claim 1.

11. A multilayer adhesive sheet comprising: a base layer; a first adhesive layer stacked on a surface of the base layer; and a second adhesive layer stacked on another surface of the base layer, wherein the base layer comprises a polyurethane-based film manufactured by solution casting and has a storage modulus of 700 MPa to 1,500 MPa at −20° C. and a storage modulus of 10 MPa to 100 MPa at 85° C., wherein the base layer has a thickness of 10 μm to 20 μm, wherein the base layer has a Young's modulus of 100 MPa to 500 MPa at 25° C., wherein a laminate of the first adhesive layer, the base layer, and the second adhesive layer has a tensile modulus of 0.12 GPa to 0.2 GPa at 25° C., wherein the first adhesive layer is formed of an adhesive composition comprising a monomer mixture for a hydroxyl group-containing (meth)acrylic copolymer; particles or a particle mixture comprising at least one selected from among organic particles and inorganic particles; and an initiator, and the second adhesive layer is formed of an adhesive composition comprising a monomer mixture for a hydroxyl group-containing (meth)acrylic copolymer; particles or a particle mixture comprising at least one selected from among organic particles and inorganic particles; and an initiator, and the first adhesive layer has a storage modulus of 10 kPa to 500 kPa at −20° C. and a storage modulus of 10 kPa to 100 kPa at 60° C., and the second adhesive layer has a storage modulus of 10 kPa to 500 kPa at −20° C. and a storage modulus of 10 kPa to 100 kPa at 60° C.

* * * * *